United States Patent

[11] 3,545,386

[72] Inventor Donald E. Westling
 2432 Iva Court, Beloit, Wisconsin 54816
[21] Appl. No. 784,651
[22] Filed Dec. 18, 1968
[45] Patented Dec. 8, 1970

[54] MACHINE FOR DISPENSING LIQUID
 7 Claims, 8 Drawing Figs.
[52] U.S. Cl. .................................................. 107/1,
 107/27, 107/52
[51] Int. Cl. ..................................................... A23g 3/02
[50] Field of Search.......................................... 107/1, 1.2,
 1.5, 27, 52, 54; 18/11, 13, 36; 118/13; 62/381;
 220/129.1

[56] References Cited
UNITED STATES PATENTS
1,879,328  9/1932  Kremmling................... 107/27
2,708,055  5/1955  Alexander..................... 107/27X
3,358,618  12/1967 Vetta............................. 107/1

Primary Examiner—Louis K. Rimrodt
Attorney—Wolfe, Hubbard, Leydig, Voit & Osann

ABSTRACT: A dispensing pump is moved automatically between a reservoir of sauce and a pizza to suck up a quantity of sauce from the reservoir and to discharge the sauce onto the pizza. The pump is formed by loosely telescoped sleeves and tubes defining chambers which are sealed by water. When the sleeves are alternately shifted away from and toward the tubes, the chambers are expanded and then contracted to cause sauce first to be sucked into and then discharged out of a series of lower nozzles communicating with the tubes.

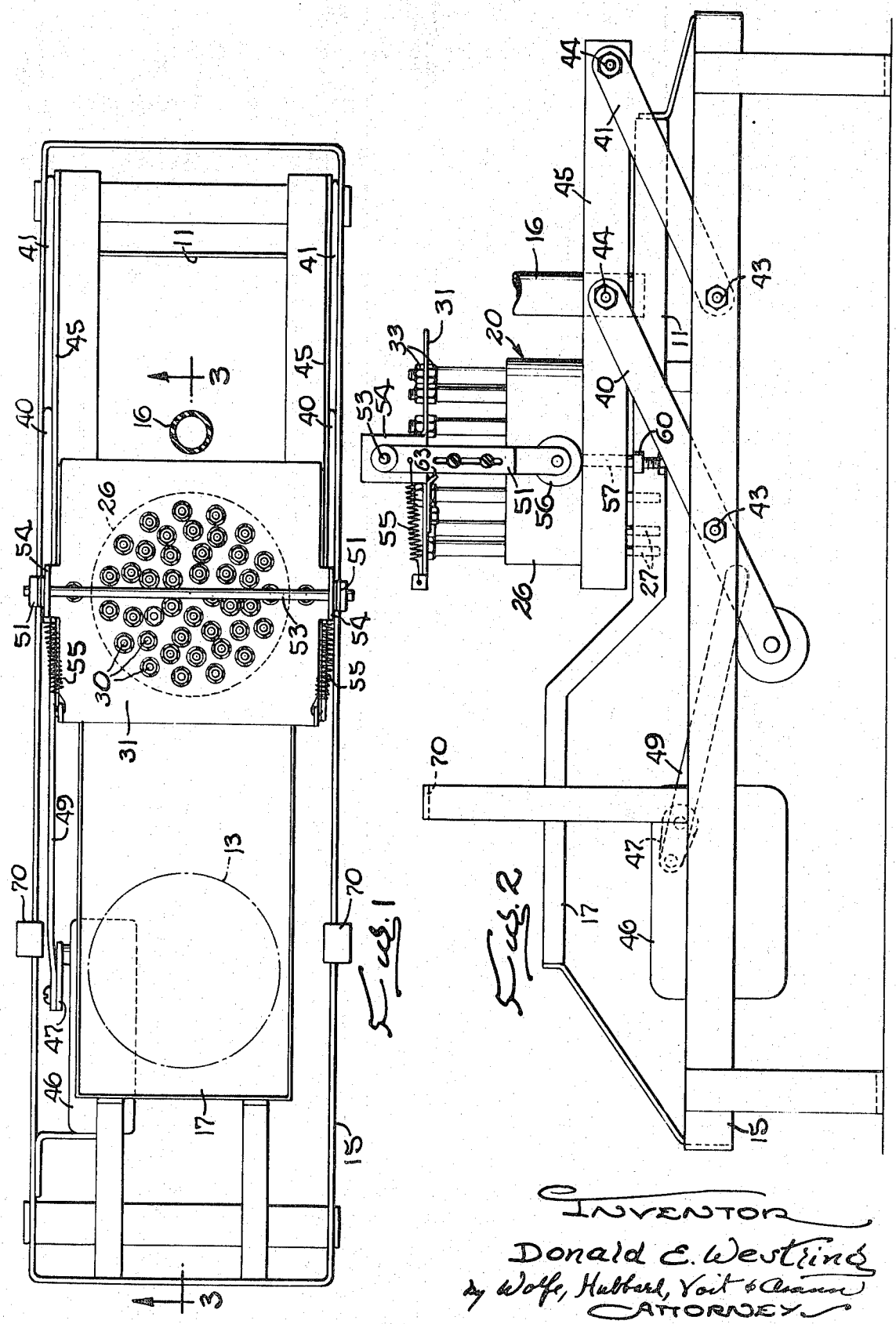

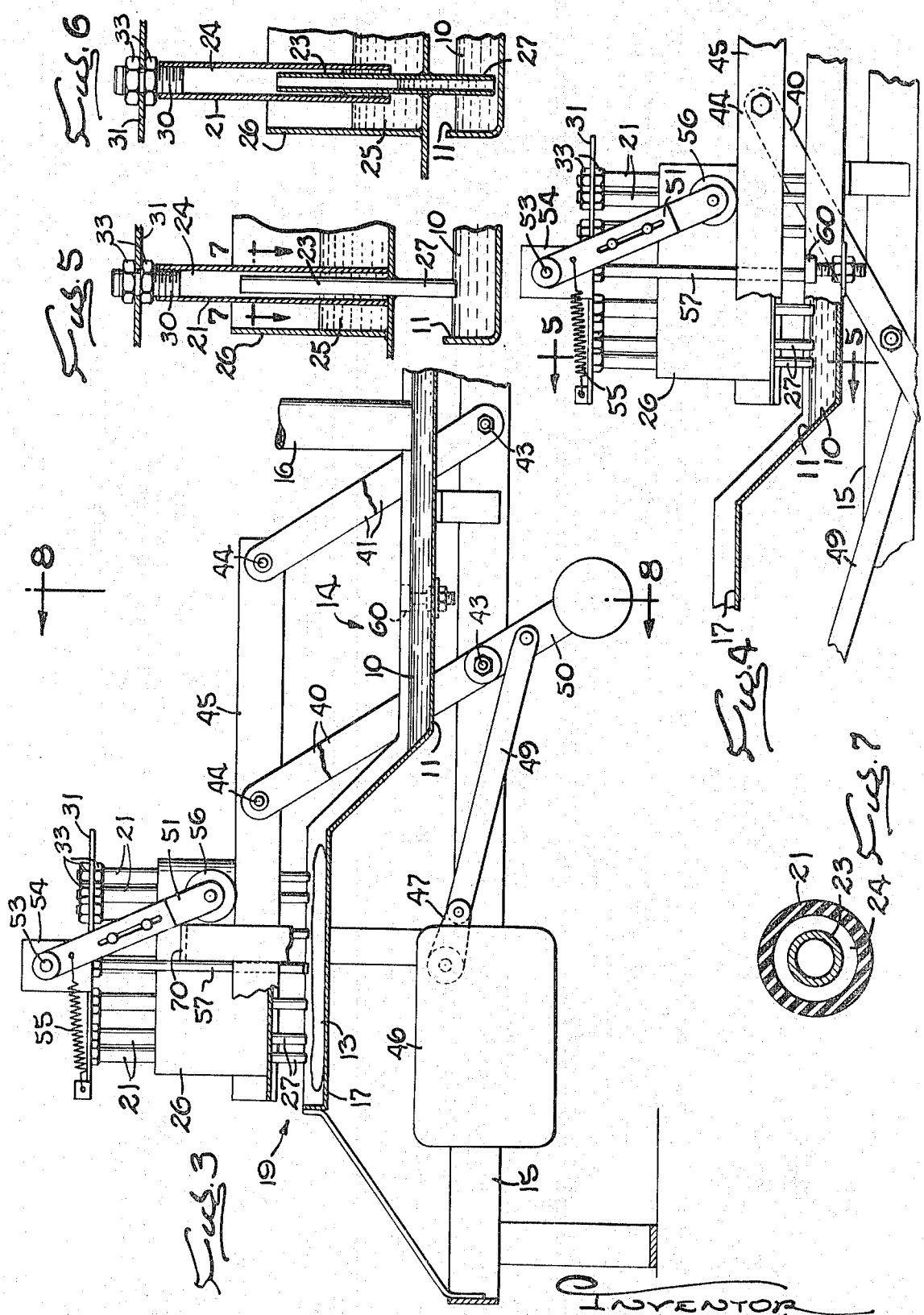

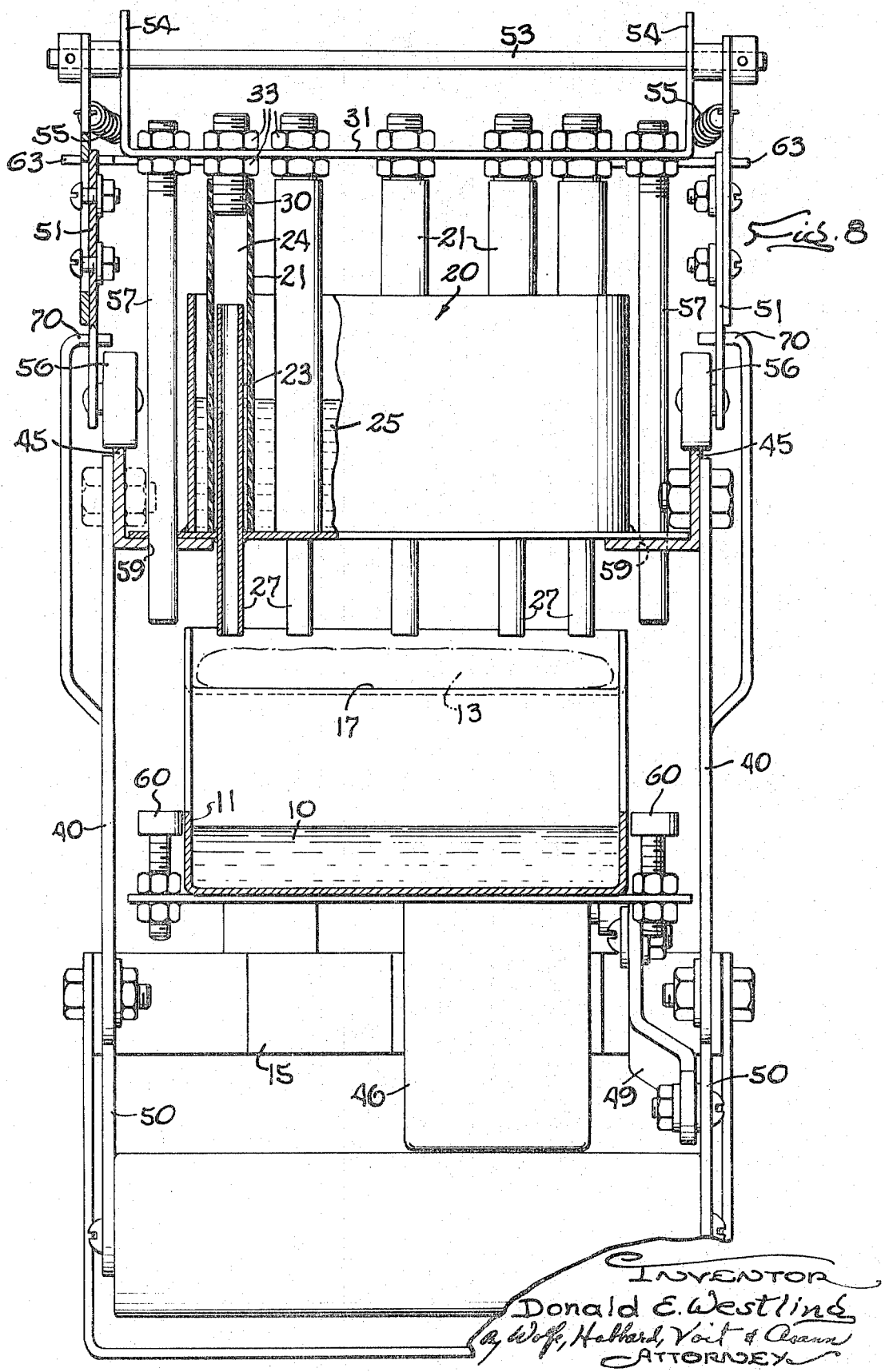

MACHINE FOR DISPENSING LIQUID

BACKGROUND OF THE INVENTION

This invention relates to a machine for dispensing liquid and, more particularly, to a machine for dispensing liquid sauce and the like onto pizzas prior to baking of the latter. One example of such a machine is disclosed in U.S. Pat. No. 3,358,618.

SUMMARY OF THE INVENTION

The general aim of the present invention is to provide a new and improved sauce dispensing machine which is simpler in construction, capable of faster operation, easier to clean and assemble, and subject to less wear and trouble in service use than prior machines used for related purposes. In large, these ends are achieved through the provision in the machine of a novel dispensing pump with multiple expandable chambers operable to suck up sauce in a supply reservoir into a series of nozzles and then discharge the sauce onto the pizza, the pump being characterized not only by the use of liquid to seal the pump chambers but also by the formation of the chambers from loosely telescoped sleeves and tubes which may reciprocate relative to one another without abrasive rubbing contact and without need of being mechanically sealed to one another.

A further object of the invention is to shift the dispensing pump back and forth between the sauce reservoir and successive pizzas to be baked and to operate the pump through sauce dispensing cycles in timed relation with and automatically as an incident to such shifting.

The invention also resides in the unique and comparatively simple mechanism for shifting the dispensing pump and for effecting operation of the pump through its dispensing cycles.

Other objects and advantages of the invention will become apparent from the following detailed description when taken in conjunction with the accompanying drawings.

BRIEF DESCRIPTION OF THE DRAWINGS

FIG. 1 is a top plan view of a new and improved sauce dispensing machine embodying the novel features of the present invention.

FIG. 2 is a side elevation of the machine shown in FIG. 1.

FIG. 3 is a fragmentary cross section taken substantially along the line 3–3 of FIG. 1 and showing certain parts in moved positions.

FIG. 4 is a fragmentary view similar to FIG. 3 but showing the parts in still further moved positions.

FIG. 5 is an enlarged fragmentary cross section taken substantially along the line 5–5 of FIG. 4.

FIG. 6 is a view similar to FIG. 5 but showing certain parts in moved positions.

FIG. 7 is an enlarged cross section taken along the line 7–7 of FIG. 5.

FIG. 8 is an enlarged fragmentary cross section taken substantially along the line 8–8 of FIG. 3.

DESCRIPTION OF THE PREFERRED EMBODIMENT

As shown in the drawings for purposes of illustration, the invention is embodied in a machine for receiving a quantity of liquid such as sauce 10 (FIG. 3) from a supply reservoir 11 and for dispensing the sauce onto a pizza 13 or the like before the pizza is placed in an oven and baked. The reservoir, which is located in a filling station 14, is in the form of an upwardly opening dish mounted on a supporting frame 15 and is filled to a constant level with sauce delivered through a supply spout 16. Successive pizzas to be covered with sauce are placed one-by-one on a platform 17 which is supported on the frame and above the reservoir in a dispensing station 19 located forwardly of the reservoir.

In its primary aspect, the present invention contemplates dispensing the sauce 10 onto the pizzas 13 with a novel dispensing pump 20 which, when compared with prior arrangements of the same general type, is significantly simpler in construction and is more durable and trouble free in service use. To fulfill these purposes, the pump comprises a series of plungers 21 (FIGS. 5 and 8) and tubes 23 which are telescoped loosely with one another in a unique manner to define expandible chambers 24 that are sealed by liquid 25 to keep the chambers airtight in spite of the loose fit between the plungers and the tubes. As the plungers and tubes are reciprocated relative to one another, the chambers first are expanded to suck the sauce into the tubes and then are contracted to expel the sauce onto the pizza. Being loosely telescoped, the plungers and tubes may reciprocate freely relative to each other without being subjected to wear as a result of rubbing contact and, with the chambers 24 sealed by the liquid 25, the need for using separate sealing elements between the plungers and tubes is eliminated.

Herein, the plungers 21 and the tubes 23 are disposed in an upwardly opening container 26 which is adapted to be moved back and forth between the reservoir 11 of sauce 10 in the filling station 14 and the pizza 13 in the dispensing station 19. As shown most clearly in FIGS. 1 and 8, several of the tubes are arranged in concentric circles around the container to enable covering of substantially all of the pizza with sauce when the latter is discharged out of the tubes. Each tube is soldered to the lower wall of the container with a liquid tight seal and extends downwardly through the lower wall to present a lower nozzle portion 27 adapted for immersion in the sauce in the reservoir.

In carrying out the invention, the plungers 21 are formed by cylindrical sleeves which may be telescoped over the upper end portions of the tubes 23 with a loose fit to avoid wearing rubbing contact between the sleeves and the tubes during relative reciprocation of the two. Herein, the inside diameter of each sleeve 21 is approximately three thirty-seconds of an inch greater than the outside diameter of the corresponding tube. At their upper ends, the sleeves are sealed airtight by plugs 30 (FIG. 8) and are connected to a single platelike member 31 by nuts 33 threaded onto the plugs. It will be seen that the sleeves coact with the tubes to define the chambers 24 between the upper ends of the sleeves and the upper ends of the tubes. As shown most clearly in FIG. 8, the container 26 is filled with the liquid 25, which herein is water, to a level just short of the upper ends of the tubes and thus the water seals the chambers airtight by preventing the entry and escape of air into and out of the chambers between the tubes and the lower end portions of the sleeves.

To dispense the sauce 10, the nozzles 27 are dipped into the reservoir 11 and below the level of the sauce while the sleeves 21 are telescoped fully over the tubes 23 as shown in FIG. 5. Thereafter, the container 26 is shifted downwardly relative to the plate 31 to cause the tubes to move downwardly in unison relative to the sleeves (see FIG. 6) thereby to enlarge the sealed chambers 24 and to allow the air therein to expand. As a result, a partial vacuum is created in each of the chambers and acts to such the sauce upwardly into the nozzles 27 at the lower ends of the tubes. The downward stroke of the container is sufficiently short that the lower ends of the sleeves remain immersed in the water 25 and thus the chambers 24 remain sealed to hold the sauce in the nozzles.

With charges of sauce 10 sucked upwardly into the nozzles 27, the sleeves and tubes are held in their retracted positions shown in FIG. 6, and the dispensing pump 20 is moved to the dispensing station 19 to position the nozzles over the pizza 13. In the dispensing station, the plate 31 is moved downwardly relative to the container 26 to move the upper ends of the sleeves 21 downwardly toward the upper ends of the tubes 23. Accordingly, the chambers 24 are contracted and the air therein is compressed by the plugs 30 which act as pistons to force the sauce out of the nozzles 27 and onto the pizza with a positive pumping action.

From the foregoing, it will be apparent that the dispensing pump 20 is of relatively simple construction and yet dispenses the sauce 10 in a positive manner and without any slop or drip occurring as the pump is moved from the reservoir 11 to the pizza 13. By forming the chambers 24 with the sleeves 21 and the tubes 23 and by sealing the chambers with the water 25, the tubes and sleeves may be telescoped loosely to avoid the need of precisely fitting the two and to eliminate wear which otherwise would occur as a result of rubbing contact.

According to another aspect of the invention, the pump 20 is automatically shifted back and forth between the filling station 14 and the dispensing station 19 and is operated through its dispensing cycles automatically as an incident to such shifting. In this way, successive pizzas 13 can be covered with sauce 10 in a rapid and efficient manner.

In this instance, the pump 20 is mounted for shifting by sets of parallel links 40 and 41 whose lower ends are connected pivotally to the frame 15 as indicated at 43 in FIG. 3 and whose upper ends are connected pivotally at 44 to a pair of horizontal rails 45 which are fastened rigidly to opposite sides of the container 26. Shifting of the pump between the filling and dispensing stations 14 and 19 is effected by an electric motor 46 (FIG. 3) mounted on the frame 15 and operable to rotate a crank 47 which is connected by a pitman 49 to an extension 50 of one of the links 40. With each revolution of the crank, the links 40 and 41 are swung first in one direction and then the other about the pivots 43. As the links swing counterclockwise, the pump 20 is raised first upwardly from a filling position (FIG. 2) in which the lower ends of the nozzles 27 are immersed in the sauce 10 in the reservoir 11 and is lifted to an elevated position in which the nozzles are located above the reservoir and the level of the platform 17. Thereafter, the pump is shifted forwardly (see FIG. 3) to move the nozzles into overlying relation with the pizza 13 on the platform. When the links are swung clockwise, the pump is shifted rearwardly to a position above the reservoir and then is returned downwardly to the filling position. Thus, the nozzles 27 are sequentially raised out of the sauce, shifted forwardly to the pizza, returned reversely to the reservoir, and lowered back into the sauce.

To operate the pump 20 through its dispensing cycles upon shifting of the pump between the sauce 10 and the pizza 13, two operators 51 (FIG. 3) are connected to the plate 31 and are operable to cause relative movement between the plate and the container 26, and thus between the sleeves 21 and the tubes 23, each time the nozzles 27 are lowered into the sauce and each time the nozzles are positioned above the pizza. Herein, the operators are in the form of generally upright and lengthwise adjustable arms disposed on opposite sides of the container and fastened securely at their upper ends to a horizontal shaft 53 (FIG. 8) which is journaled for turning between a pair of flanges 54 turned upwardly from the plate 31. Tension springs 55 stretched between the arms 51 and the plate urge the arms clockwise about the axis of the shaft and serve to press rollers 56 on the lower ends of the arms against the upper edges of the rails 45. The rollers thus ride along the rails when the arms are swung back and forth.

As shown in FIG. 8, the plate 31 is mounted for up and down shifting relative to the rails 45 and the container 26 by upright rods 57 whose upper ends are connected to the plate and whose lower ends are guided slidably in holes 59 in the rails. When the links 40 and 41 start shifting the container 26 downwardly and the nozzles 27 start dipping into the sauce 10, the lower ends of the guide rods 57 move into engagement with vertically adjustable stops 60 located on opposite sides of the reservoir (see FIGS. 4 and 8). Accordingly, the plate 31 and the sleeves 21 are held stationary while the container 26, the tubes 23 and the nozzles 27 continue to move downwardly (see FIG. 2). As a result, the tubes are pulled away from the sleeves to expand the chambers 24 and to cause the sauce to be sucked upwardly into the nozzles.

When the container 26 and the rails 45 shift downwardly relative to the plate 31, the vertical spacing between the rails and the plate increases to allow the springs 55 to swing the arms 51 clockwise from inclined positions shown in FIG. 4 to vertical positions shown in FIG. 2, the arms being held against further clockwise swinging from their vertical positions by tabs 63 on the plate 31. In their vertical positions, the arms 51, together with the rollers 56, act as braces between the plate 31 and the rails 45 to cause the plate to move in unison with the rails when the latter are raised upwardly. Accordingly, when the links 40 and 41 are swung counterclockwise to raise the rails 45, the arms 51 and the sleeves 21 from shifting vertically relative to the rails 45, the container 26 and the tubes 23 and, as a result, the chambers 24 are held in their expanded conditions to retain the charges of sauce 10 in the nozzles 27 as the pump 20 is moved from the reservoir 11 toward the pizza 13.

As the pump 20 moves forwardly into overlying relation with the pizza 13, the arms 51 engage a pair of stops 70 (FIG. 3) upstanding from the frame 15 on opposite sides of the platform 17. The stops thus trip the arms rearwardly and cause the arms to swing counterclockwise from their vertical positions and across an imaginary vertical center line extending through the shaft 53. Accordingly, the arms swing to their inclined positions (FIG. 3) and no longer act as braces between the rails 45 and the plate 31 so that the latter, by virtue of its own weight, rapidly shifts downwardly relative to the container 26 to push the sleeves 21 toward the tubes 23. The air in the chambers 24 thus is compressed to pump the sauce 10 out of the nozzles 27 and onto the pizza. As the pump is returned to the reservoir 11, the arms 51 remain in their inclined positions (FIGS. 3 and 4) since the force exerted by the springs 55 is insufficient to shift the plate 31 upwardly to allow the arms to swing back to their vertical positions. As a result, the sleeves 21 and the tubes 23 remain in their relatively collapsed positions until the nozzles 27 once again dip into the reservoir and until the guide rods 57 engage the stops 60 to retract the sleeves and tubes and expand the chambers to suck additional sauce into the nozzles.

It will be apparent from the foregoing that the pump 20 is shifted automatically back and forth between the reservoir 11 and the pizza 13, is operated automatically through its dispensing cycles, and yet only the single motor 46 is required to effect the entire dispensing operation. The machine is comparatively fast and can apply sauce to as many as 10 pizzas per minute. By adjusting the position of the stops 60 and by lengthening or shortening the arms 51, the reciprocating stroke of the sleeves 21 relative to the tubes 23 can be changed to permit larger or smaller quantities of sauce 10 to be sucked into the nozzles 27. Also, simply by manually pulling the plate 31 upwardly, the sleeves can be pulled off of the tubes for cleaning purposes, and then can be retelescoped over the tubes quickly and conveniently.

I claim:

1. In a machine for dispensing liquid sauce and the like, the combination of, a support, an upwardly opening reservoir of sauce located in a filling station adjacent said support, a dispensing pump mounted on said support for movement from said filling station to a dispensing station and back, said dispensing pump comprising a container, at least one upright tube disposed within said container and having a lower nozzle portion extending through and depending from the lower wall of the container for insertion into the sauce when said dispensing unit is in said filling station, an upright sleeve with a sealed upper end telescoped over the upper portion of said tube and coacting with the latter to define a chamber between the upper ends of the sleeve and the tube, a quantity of liquid filling said container to a level above the lower end of the sleeve to seal off said chamber from the atmosphere, means for producing relative shifting of said sleeve away from said tube when said dispensing pump is in said filling station while keeping the lower end of said sleeve immersed in said liquid thereby to expand said chamber and create a partial vacuum therein to suck sauce from said reservoir upwardly into said nozzle, and means for producing relative shifting of said sleeve toward said tube when said dispensing pump is in said dispensing station thereby to contract said chamber and compress the atmosphere therein to pump said sauce out of said nozzle.

2. A dispensing device as defined in claim 1 in which a series of upright tubes are disposed within said container, a series of sleeves with sealed upper ends telescoped slidably over said tubes, and a member interconnecting said sleeves whereby the latter may be shifted toward and away from said tubes in unison by moving said member downwardly and upwardly relative to said container.

3. In a machine for dispensing liquid sauce and the like, the combination of, a support, an upwardly opening reservoir of sauce located adjacent said support, a dispensing pump comprising a container, a series of upright tubes disposed within said container and having lower nozzle portions extending through and depending from the lower wall of said container, means mounting said dispensing pump on said support for movement (a) upwardly from a filling position in which the lower ends of said nozzles are immersed in said sauce to an elevated position in which the lower ends of said nozzles are located above said reservoir (b) laterally away from said reservoir to a dispensing station (c) laterally back into overlying relation with said reservoir and (d) back downwardly to said filling position, upright sleeves with sealed upper ends telescoped over said tubes and coacting with the latter to define individual chambers between the upper ends of the sleeves and the tubes, a quantity of liquid filling said container to a level above the lower ends of said sleeves to seal off said chambers from the atmosphere, means for producing relative shifting of said sleeves away from said tubes when said dispensing pump is in said filling position thereby to expand said chambers and create a partial vacuum therein to suck sauce from said reservoir upwardly into said nozzles, and means for producing relative shifting of said sleeves toward said tubes when said dispensing pump is in said dispensing station thereby to contract said chambers and compress the atmosphere therein to pump said sauce out of said nozzles.

4. A machine as defined in claim 3 in which said mounting means comprises a parallelogram linkage connected between said support and said dispensing pump, and further including mechanism for swinging said linkage first in one direction and then in the other direction to cause said dispensing pump to sequentially move upwardly, laterally, reversely and downwardly relative to said reservoir.

5. A machine as defined in claim 3 further including a member interconnecting said sleeves whereby the latter may be shifted toward and away from said tubes in unison by lowering and raising said member relative to said container.

6. A machine as defined in claim 5 in which said means for producing relative shifting of said sleeves toward and away from said tubes include an operator connected pivotally to said member and swingable in one direction to lower the member relative to the container and in the opposite direction to raise the member relative to the container, a first stop located on said support and operable to engage said operator and swing the latter in one direction as an incident to lateral movement of the dispensing pump into said dispensing station, and a second stop located on said support and operable to cause swinging of the operator in the other direction as an incident to downward movement of said dispensing pump to said filling position.

7. In a device for dispensing liquid sauce and the like, the combination of, a container, a series of upright tubes disposed within said container and having lower nozzle portions extending through and depending from the lower wall of the container for insertion into a reservoir of sauce, upright sleeves with sealed upper ends telescoped over said tubes and coacting with the latter to define individual chambers between the upper ends of the sleeves and the tubes, a quantity of liquid filling said container to a level above the lower ends of said sleeves to seal off said chambers from the atmosphere, a member interconnecting said sleeves and adapted to be moved upwardly relative to said container to shift said sleeves in unison away from said tubes thereby to expand said chambers and create a partial vacuum therein to suck said sauce upwardly from said reservoir and into said nozzles, and said member being adapted to move downwardly relative to said container to shift said sleeves in unison toward said tubes thereby to contract said chambers and compress the atmosphere therein to pump said sauce out of said nozzles.